…

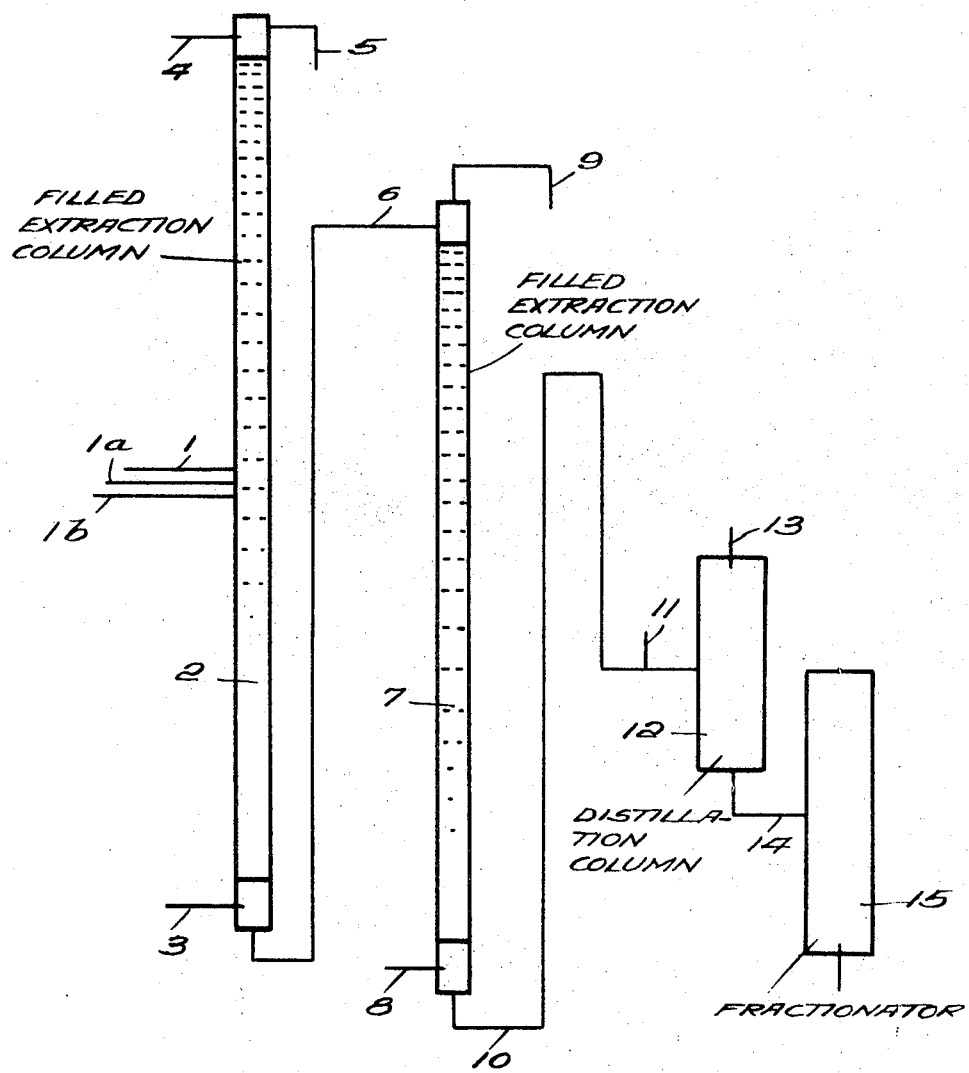

United States Patent Office 3,519,650
Patented July 7, 1970

---

3,519,650
PURIFICATION OF TRIOXANE
Werner Fleck, Gross-Auheim, and Theodor Lüssling, Hanau am Main, Germany, assignors to Deusche Gold- und Silber-Scheideanstalt vormals Roessler, Frankfurt am Main, Germany
Filed Sept. 5, 1967, Ser. No. 665,451
Int. Cl. C07d 19/00
U.S. Cl. 260—340                                10 Claims

---

ABSTRACT OF THE DISCLOSURE

Method of purifying trioxane comprising dissolving the trioxane in a water immiscible organic solvent, washing such solution with water and subsequently washing such solution with an aqueous alkaline solution, then distilling off the solvent from the washed solution, and fractionally distilling the trioxane remaining as a residue in the presence of a tertiary amine which is stable and nonvolatile under the conditions of the fractional distillation.

---

BACKGROUND OF THE INVENTION

The present invention relates to an improved method for the purification of trioxane.

Trioxane, which is obtained in the distillation of aqueous formaldehyde solutions in the presence of an acid catalyst, as is known, contains impurities such as formaldehyde, formic acid and water. This trioxane is recovered from the distillate either by extraction with an organic solvent or by crystallization. In both instances these measures alone do not suffice to effect complete purification.

It is also known that the formaldehyde contained as an impurity can be bound as condensation products by the addition of —NH or —NH$_2$ containing compounds. The consumption of the chemical assistants must be taken into consideration in this process (Belgian Pat. 627,457). It also is known that trioxane, after removal of the extraction agent can be treated at an elevated temperature before or during its distillation with solid alkali metal or alkaline earth metal hydroxides (German published application 1,178,082). In this instance, in view of the formaldehyde content of the trioxane, saccharification products are produced which, for instance, deposit on the solid hydroxides and gradually inactivate them so that from time to time the operation must be interrupted to replace the exhausted hydroxides with fresh hydroxides. If alkali or alkaline earth metals are employed there is the disadvantage that they are difficult to handle on a technical scale. They, for example, can react very vigorously during the cleaning or filling of the apparatus with access of air, or upon contact with water or the chlorohydrocarbons which may be used as solvent for the trioxane.

It is also known that crystalline trioxane is converted to polyoxymethylene under the influence of monomeric formaldehyde (H. W. Kohlschütter, Ann. 482, 74–104, 1930). As traces of formaldehyde which cannot be detected analytically are extremely difficult to remove from trioxane, normal commercial trioxane which has been stored for longer periods usually contains considerable quantities of polyformaldehyde.

SUMMARY OF THE INVENTION

According to the invention, it was found that trioxane can be purified by dissolving the trioxane in a water immiscible organic solvent, washing the solution one or more times with water and thereafter treating the solution one or more times with an aqueous alkaline solution, distilling off the solvent after the treatment, adding a tertiary amine, which is soluble in trioxane and stable and nonvolatile under the conditions of a trioxane distillation, before, during or after the solvent is distilled off, and fractionally distilling the trioxane remaining as residue in contact with said tertiary amine.

BRIEF DESCRIPTION OF THE DRAWING

The accompanying drawing diagrammatically shows an apparatus suitable for carrying out the process according to the invention.

DETAILED DESCRIPTION OF THE INVENTION INCLUDING PREFERRED EMBODIMENTS

The process according to the invention can be carried out using trioxane as the starting material, but it is also possible to stir the trioxane containing distillate obtained in the production of trioxane from aqueous formaldehyde solutions with an organic water immiscible solvent and use the two phases which are formed as starting material.

It has been unexpectedly found that trioxane is stabilized, even in the presence of traces of formaldehyde, by the addition of small quantities of the tertiary amines indicated so that during crystallization and storage of the solid trioxane, as well as during repeated melting and solidification, polymer formation practically does not occur. Even during distillation reformation of formaldehyde from the trioxane is prevented.

Suitable water immiscible solvents for the process according to the invention, for instance, are halohydrocarbons, ethers and hydrocarbons. The solutions in general contain 10 to 50 wt. percent and preferably 20 to 30 wt. percent of trioxane. Aqueous alkali metal and/or alkaline earth metal hydroxide and/or carbonate solutions are used as the aqueous alkaline solutions. Aqueous NaOH solutions are especially satisfactory. Such solutions in general are of a concentration of 3 to 30 wt. percent, preferably, 8 to 10 wt. percent.

The tertiary amines which are concerned in the process according to the invention are in general such tertiary amines whose boiling point is above 300° C., examples thereof, for instance, are high boiling amines of the formula

in which R$^1$, R$^2$ and R$^3$ are straight or branch chained alkyl radicals, substituted if desired, such as, dimethyl octadecyl amine; dimethyl cetylamine or triethanol amine, high boiling aromatic amines in which the aromatic portion may be partially or wholly saturated, such as high boiling benzene derivatives which are substituted by one or more secondary amino groups, high boiling condensed aromatic compounds or compounds containing aromatic groups connected to each other simply by, for example, carbon to carbon bonds or by a bridge, such as, oxygen, sulfur, —CO—, or alkylene bridges which carry at least one secondary amino group on the aromatic portion thereof, such as, for example, bis-p-dimethylaminophenyl)-methane, N-dibenzyl-β-naphthylamine, Michler's ketone, diethanol-p-toluidine, high boiling mononulear or polynuclear heterocyclic compounds (condensed or connected by simple linkage as indicated for the aromatics) or aromatic character with at least one tertiary basic amino nitrogen in the ring portion, such as, 4,4'-dipyridyl, diquinolyl-(2,6), 2,6-dimethyl-4-pentadecyl pyridine; high boiling compounds composed of at least two condensed saturated ring systems with at least one tertiary amino nitrogen in the ring portion, such as, spartein. The tertiary amino compounds employed according to the invention can carry other substituents, such as, halogen, hydroxy, alkoxy, mercapto, carbalkoxy, acyloxy, sulfinyl, sulfonyl, dialkylamino, sulfonic acid ester, oxoalkyl, carboxy groups altered by anhydride formation and the like.

The amines can be used in quantities of about 0.01 to 10 wt. percent, preferably, about 0.1 to 2 wt. percent, with reference to the dissolved trioxane. Actually no upper limitation is necessary. For example, the process can also be carried out with 20 wt. percent of tertiary amine. The upper limit is only a question of economy.

The process according to the invention has the advantage that no resinification occurs and therefore no undesired interruptions are necessary when it is carried out continuously. In addition, a trioxane is obtained thereby which can easily be polymerized to polyoxymethylenes of high molecular weight. Furthermore, no formaldehyde is lost because of chemical reactions. The unconverted formaldehyde therefore can be recovered.

Depending upon whether the trioxane solution is treated once or several times with the aqueous alkaline solution, various qualities of trioxane can be obtained. If such treatment is once, a trioxane is obtained which can be polymerized to a polyoxymethylene of a molecular weight below 60,000. If, on the other hand, the treatment is repeated a number of times, whereby also dilute alkaline solutions may also be used, a trioxane is obtained which can be polymerized to a polyoxymethylene with a molecular weight over 100,000. If such a trioxane is desired it is expedient not to recycle the aqueous alkaline solution but rather to use freshly prepared relatively dilute solutions.

The purification of trioxane according to the invention advantageously can be carried out in a apparatus such as is shown in the drawing as described below.

A solution of trioxane in an organic solvent, such as, for example, in methylene chloride is supplied over inlet 1 to column 2 which contains filling bodies. It, however, also is possible to stir up the trioxane containing distillate obtained in the production of trioxane from aqueous formaldehyde solutions, either continuously or discontinuously, with an organic solvent and supply the two phases which form to column 2 simultaneously over conduits 1a and 1b. Water is supplied below through conduit 3 to wash the trioxane solution. The aqueous phase is treated near the top of column 2 with fresh solvent supplied through conduit 4 to effect complete removal of trioxane, and leaves the column through the overflow conduit 5 as a weak formaldehyde solution which can reused. The pre-cleaned trioxane solution is supplied to a countercurrent washing column 7 containing filling bodies over conduit 6. Fresh dilute aqueous alkaline washing solvent is continuously supplied to the bottom of column 7 over conduit 8. Such washing solution leaves the column through conduit 9. The trioxane containing methylene chloride solution flows off over conduit 10, which is formed as a syphon and a small quantity of the tertiary amine employed as stabilizer supplied over conduit 11 before it is introduced into distillation column 12. The methylene chloride is drawn off together with water from the top of the distillation column through conduit 13. The amine containing trioxane is withdrawn from the bottom of the column through conduit 14 and fractionated in at least one fractionating column (for example column 15). It is possible also to admix the amine with the trioxane after the solvent has been distilled off.

The extraction with the aqueous alkaline solution can be carried out in other apparatus operating under the same principle, such as, for example, in mixer-settler batteries.

The following examples will serve to illustrate the process according to the invention.

Example 1

Trioxane containing distillate obtained in the distillation of an aqueous formaldehyde solution in the presence of acid was cooled to 10–15° C. and the trioxane which precipitated filtered off and dissolved in such a quantity of methylene chloride that a 30 wt. percent solution was obtained. This solution was shaken out 3 times with $\frac{1}{10}$ its volume of water and then shaken out 3 times with $\frac{1}{12}$ its volume of 2 N NaOH. In each instance the aqueous phase was separated off. 0.01 wt. percent of triethanol amine (based on the trioxane content of the solution) was added to the solution and the solvent distilled off in a distillation column. The residue was fractionated. About 60% of the trioxane supplied was recovered as a polymerizable product.

Example 2

Trioxane which was recovered from a trioxane containing distillate as in Example 1 was dissolved in such a quantity of methylene chloride that a 50 wt. percent was obtained. 5 parts by volume per hour of such solution was supplied to a filled column 2 as shown in the drawing, 5 parts by volume of methylene chloride per hour were supplied to the top of the column and 8 parts by volume per hour of water were supplied to the bottom of the column. The aqueous phase which left the top of the column contained formaldehyde and was practically free of trioxane. The trioxane solution withdrawn from the bottom of the column was supplied to the top of column 7 as shown in the drawing and 1 part by volume per hour of 2 N NaOH supplied to the bottom of the column. The aqueous phase with withdrawn from the top of the column through an overflow conduit and the washed methylene chloride solution from the bottom of the column. 0.1 wt. percent of bis-(p-dimethylaminophenyl)-methane was dissolved in the latter (based on the trioxane content of the solution) and such solution supplied to a continuously operating distillation column, the sump of which was heated. The methylene chloride was recovered from the head of the column and the trioxane containing the amine employed as stabilizer from the sump. The liquid trioxane containing the amine thus obtained as the residue was fractionally distilled. Pure trioxane distilled off from the head of the fractionation column. It was of a grade that it could be used for the production of high molecular weight polyoxymethylene. With such continuous process 95–99% of the trioxane supplied could be recovered as a polymerizable product.

Example 3

Trioxane containing distillate obtained in the distillation of aqueous formaldehyde in the presence of acid was stirred into $\frac{1}{3}$ its weight of methylene chloride whereby two phases formed. Both phases were simultaneously supplied to a filled column 2 as shown in the drawing in the volume ratio in which these occurred over conduits 1a and 1b. The further processing was as in Example 2 except that 2 N KOH was employed as the aqueous alkaline solution and 4,4'-dipyridyl was employed as the amine. Again in such continuous process 95–99% of the trioxane supplied could be recovered as a polymerizable product.

We claim:
1. In a process for the purification of trioxane employing basically reacting reagents, the steps of dissolving the trioxane in a water immiscible inert organic solvent, washing such solution at least once with water, and subsequently at least once with an aqueous alkaline solution, distilling off the solvent and then fractionally distilling off the trioxane remaining as a residue in contact with a tertiary amine which is stable and nonvolatile under the conditions of said trioxane distillation and which is soluble in trioxane.

2. The process of claim 1 in which said tertiary amine is incorporated in said trioxane after the alkaline wash but before the trioxane distillation.

3. The process of claim 1 in which an aqueous solution of an alkali selected from the group consisting of alkali metal and alkaline earth metal hydroxides and carbonates is employed for the alkaline wash.

4. A process according to claim 1 wherein the tertiary amine has a boiling point above 300° C.

5. A process according to claim 4 wherein the organic solvent solution contains 10 to 50% trioxane.

6. A process according to claim 5 wherein an aqueous solution of 3 to 30% of an alkali selected from the group consisting of alkali metal and alkaline earth metal hydroxides and carbonates is employed for the alkaline wash.

7. A process according to claim 6 wherein the tertiary amine is employed in an amount of 0.01 to 20% by weight of the trioxane.

8. A process according to claim 1 wherein the organic solvent solution contains 10 to 50% trioxane.

9. A process according to claim 1 wherein an aqueous solution of 3 to 30% of an alkali selected from the group consisting of alkali metal and alkaline earth metal hydroxides and carbonates is employed for the alkaline wash.

10. A process according to claim 4 wherein the tertiary amine is employed in an amount of 0.01 to 20% by weight of the trioxane.

References Cited

UNITED STATES PATENTS

| 2,465,489 | 3/1949 | Sokol | 260—340 |
| 3,128,313 | 4/1964 | Manwiller et al | 260—606 |

FOREIGN PATENTS

| 1,449,675 | 7/1966 | France. |
| 1,027,562 | 4/1966 | Great Britain. |

NORMA S. MILESTONE, Primary Examiner